(12) United States Patent
Jenkins (10) Patent No.: US 11,041,493 B2
(45) Date of Patent: Jun. 22, 2021

(54) METHODS AND APPARATUS FOR MONITORING TRIPLEX PUMPS

(71) Applicant: Advanced Sensor Design Technologies, LLC, Houston, TX (US)

(72) Inventor: Keith Jenkins, Houston, TX (US)

(73) Assignee: ADVANCED SENSOR DESIGN TECHNOLOGIES, LLC, Houston, TX (US)

( * ) Notice: Subject to any disclaimer, the term of this patent is extended or adjusted under 35 U.S.C. 154(b) by 180 days.

(21) Appl. No.: 16/380,776

(22) Filed: Apr. 10, 2019

(65) Prior Publication Data

US 2019/0316592 A1 Oct. 17, 2019

Related U.S. Application Data

(60) Provisional application No. 62/655,927, filed on Apr. 11, 2018.

(51) Int. Cl.
*F04B 51/00* (2006.01)
*G01H 1/00* (2006.01)

(52) U.S. Cl.
CPC .......... *F04B 51/00* (2013.01); *G01H 1/003* (2013.01); *F04B 2201/0203* (2013.01); *F04B 2201/0601* (2013.01); *F04B 2201/0802* (2013.01)

(58) Field of Classification Search
CPC .. F04B 51/00; F04B 15/02; F04B 2201/0203; F04B 2201/0207; F04B 2201/0802; F04B 2201/0601; F04B 2201/06; F04D 15/0088; F04C 28/28; G01M 13/00; G01H 1/003; G01N 2291/2692; G01N 29/12
See application file for complete search history.

(56) References Cited

U.S. PATENT DOCUMENTS

| | | | | |
|---|---|---|---|---|
| 8,601,874 | B2* | 12/2013 | Kyllingstad | G01M 15/12 73/587 |
| 10,132,822 | B2* | 11/2018 | Vermelle | G01L 23/222 |
| 10,383,505 | B2* | 8/2019 | Pedley | G01V 3/08 |
| 2008/0006089 | A1* | 1/2008 | Adnan | F04B 51/00 73/587 |
| 2010/0189580 | A1* | 7/2010 | Kyllingstad | G01M 3/24 417/437 |
| 2016/0047373 | A1* | 2/2016 | Jaeger | F04B 49/065 73/168 |
| 2016/0208794 | A1* | 7/2016 | Singh | F04B 49/065 |
| 2016/0356270 | A1* | 12/2016 | Zhang | F04B 49/065 |
| 2018/0164182 | A1* | 6/2018 | Willy | G01M 3/26 |

* cited by examiner

*Primary Examiner* — Charles G Freay
(74) *Attorney, Agent, or Firm* — D'Ambrosio & Menon, PLLC; Usha Menon (57) ABSTRACT

According to an embodiment, an apparatus for detecting a characteristic of a pump includes: a housing having a first planar surface and a second planar surface opposite the first planar surface, a mount structure located on the second planar surface, wherein the mount structure is configured to facilitate attachment of the apparatus on an external surface of the triplex pump, and wherein the mount structure avoids penetrating an inside surface of the triplex pump. Advantageously, apparatus is a non-invasive device and does not involve modifications to the pump nor opening the lid of the pump.

14 Claims, 5 Drawing Sheets

METHODS AND APPARATUS FOR MONITORING TRIPLEX PUMPS

CROSS REFERENCE TO RELATED APPLICATION

This application claims the benefit of Provisional U.S. Patent Application No. 62/655,927, filed Apr. 11, 2018, and entitled "SYSTEM AND METHODS FOR NON-INVASIVE PUMP STROKE, RPM AND PUMP HEALTH DETECTION" the entire content and disclosure of which, both express and implied, is incorporated herein by reference.

FIELD OF THE INVENTION

The present invention relates to apparatus and methods for monitoring pumps, and in particular, positive displacement triplex pumps.

BACKGROUND OF THE INVENTION

Positive displacement pumps are used in oil fields to circulate high volumes of drilling fluid/mud under high pressure down the drill string and back up the annulus. There are two common types of positive displacement pumps: duplex pumps and triplex pumps. Duplex pumps have two pistons while triplex pumps have three pistons that move back and forth in liners.

Triplex pumps have three intake valves and three discharge valves. The three pistons in triplex pumps can be moved back, also called back stroke, to pull in drilling mud through open intake valves on the same side of the piston. When the pistons are moved forward, also called forward or discharge stroke, the drilling fluid is pushed out through open discharge valves on the same side of the piston and down a discharge line. Due to this, the triplex pumps are also called "single acting".

Triplex mud pumps produce pulsating flows which lead to pressure spikes. In order to accelerate the drilling fluid to maximum velocity, each piston stroke must overcome the inertia of the columns of fluid in the suction/intake and discharge pipe work. At the end of each stroke, this inertia must again be overcome to bring the fluid columns to rest. This cycle of alternate acceleration and deceleration is the primary cause of fluid pulsations or pressure spikes.

In order to avoid these pressure spikes, the drilling industry uses pulsation dampeners or dampers. For example, a triplex pump includes a pulsation dampener in the discharge line. The pulsation dampener smooths out surges or pulses created by the pistons as they discharge mud. A pulsation dampener creates an area of low pressure in the system with enough volume to absorb the pulsation. The pulsation dampener has a membrane with a "cushion" of compressible gas/air behind it that flexes to absorb the pulse, allowing a laminar flow downstream of the dampener.

Positive displacement pumps can produce the same flow at a given speed (RPM) irrespective of the discharge pressure. However, a slight increase in internal leakage as the pressure increases prevents a substantially constant or linear flow rate.

When a triplex mud pump is in operation, the driller requires information on the amount of mud flowing down hole in order to keep the operation running at peak efficiency. Many service companies provide services related to obtaining this information. Typically, this involves monitoring the pump strokes and then calculating the flow out from the pump using a standard formula involving the pump strokes per minute and the pump volume. Electronic pump stroke counters can also assist the driller by measuring the mud pump's strokes per minute and total strokes.

Triplex mud pumps are basic pumps with minimal technology. Current techniques for monitoring the pump strokes involve physically altering the pump. Two conventional solutions involve a C-clamp pump stroke sensor and a proximity switch sensor. Both techniques require the installer to make mechanical modifications to the triplex pump in order to install the sensors so that they can detect the piston stroke rate inside the pump. In order to install these sensors, the operator either needs to drill holes in the pumps in order to run cables or may be required to leave the lids or covers off the pump after installation.

These installation techniques have inherent risks and problems. For example, leaving the lids off can potentially cause drilling fluids to spill over or other similar safety hazards. If the spills exceed certain pre-determined limits, the operator may be required to report it to regulatory bodies, such as the United States Environmental Protection Agency. Modifying or drilling holes into existing pumps can also cause safety issues. Additionally, there is an associated cost with stopping drilling operations during such an installation. This may expose the environment and personnel to danger and can create liability for the drilling contractor as well as the operator of the oil and gas field.

Accordingly, there is a need for a non-invasive solution to measure desired pump characteristics, such as, piston strokes in triplex pumps. Ideally, such a solution should also monitor the speed (PRM) and health of the pump and valves.

SUMMARY OF THE INVENTION

According to an embodiment, an apparatus for detecting a characteristic of a pump includes: a housing having a first planar surface and a second planar surface opposite the first planar surface, a mount structure located on the second planar surface, wherein the mount structure is configured to facilitate attachment of the apparatus on an external surface of the triplex pump, and wherein the mount structure avoids penetrating an inside surface of the triplex pump. The housing is configured to enclose one or more sensors, such as, an accelerometer for detecting the pump characteristic. In one or more embodiments, the pump is a triplex pump having three cylinders. The mount structure can be a magnet or a similar coupling device for affixing the apparatus to a metal pump. The magnet facilitates a non-intrusive detection of the pump characteristic. The non-intrusive detection of the pump characteristic substantially eliminates production downtime at an oil rig. The housing has a third planar surface, wherein the third planar surface comprises a plurality of LED lights. At least one LED light is configured to provide an indicator of a pump characteristic, such as, the speed of rotation of the pump.

In another embodiment, a method for determining health of a triplex pump involves the steps of: providing the magnetic-base apparatus discussed above, wherein the apparatus is configured to be mounted on a pump head. The apparatus is configured to detect a first signal waveform indicative of at least one of a valve signature and a pump speed. The detected signal is input into a signal shaper circuit and a comparator circuit. The first signal is filtered to generate a second signal waveform having one or more defined peak forms. Each peak is representative of a valve signature. The method further involves putting the second signal waveform through a relay circuit to generate a third signal waveform. The relay is configured to divide the frequency of the second signal waveform by three to generate a single signal pulse representative of the speed of the pump. Each of the three waveforms is digitally transmitted to a display terminal and displayed in a single graph. The method further comprises flagging the pump for inspect when a deviance from a baseline speed is observed.

In another embodiment, a method for determining health of a triplex pump involves: providing the magnetic-base apparatus discussed above, wherein the apparatus is configured to detect one or more pump stroke signal waves, and wherein the apparatus includes a microprocessor running an algorithm for sampling detected pump stroke signal waves over a period of time or space and dividing it into one or more frequencies. This is followed by generating a graphical display of the frequencies. A first peak frequency is selected and its data is obtained from the graph. The pump stroke data can be obtained by converting the first peak frequency data into revolutions per minute (RPM). The method further comprises flagging the pump for inspect when a deviance from a predetermined baseline RPM is observed.

DESCRIPTION OF THE PREFERRED EMBODIMENTS

According to an embodiment, a non-invasive pump monitoring apparatus and methods for monitoring pump strokes, RPM and pump health is disclosed.

Figure 1A:
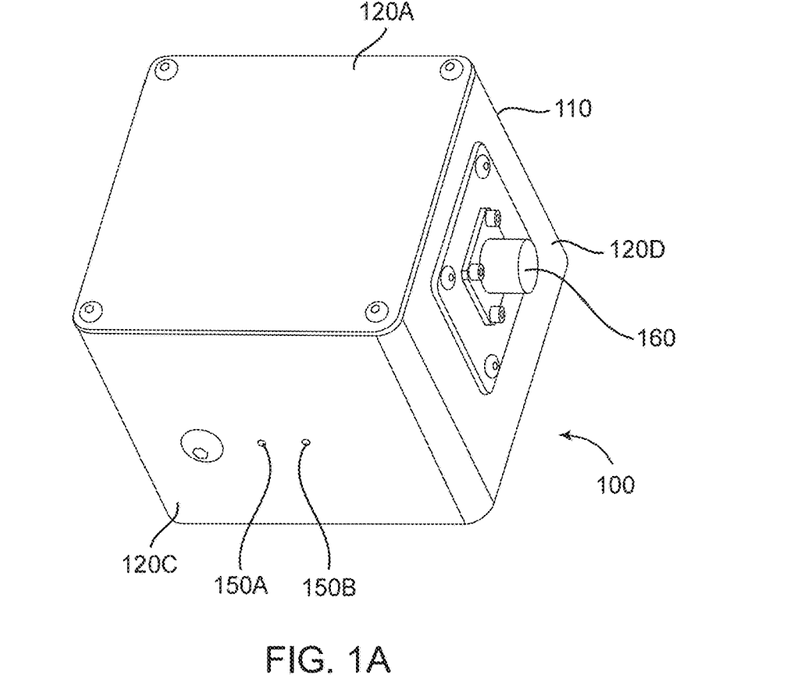
FIGS. 1A-1C illustrates an apparatus and associated circuitry for non-invasively monitoring pump strokes, according to an embodiment.
Figure 1B:
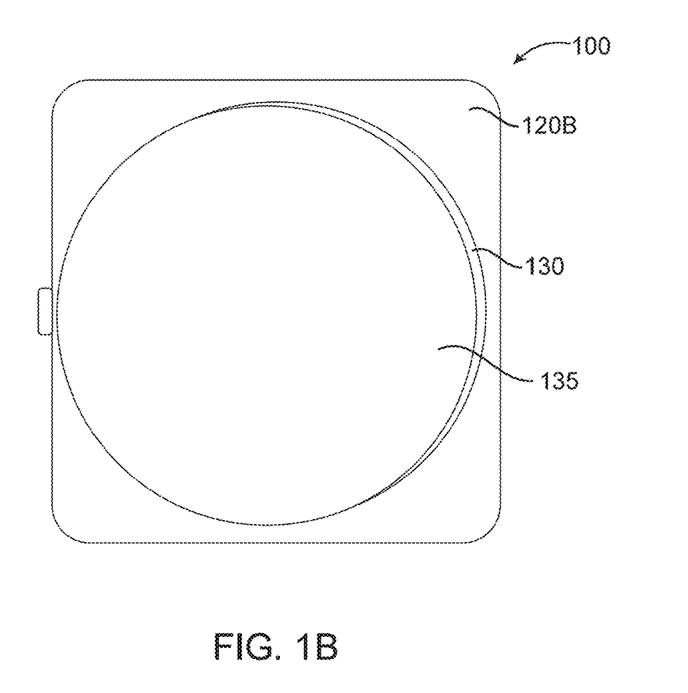

As shown in FIGS. 1A and 1B, an apparatus 100 is provided for detecting pump strokes. The apparatus 100 can be configured to detect pump valve and cylinder sealing health by monitoring valve noise and "valve signatures". A set of valve positions and the corresponding signals is known as a valve signature. The apparatus 100 is also configured to non-intrusively detect pump speed in revolutions per minute (RPM). The apparatus 100 is configured as a compact and portable device that can be mounted at any location on the exterior of a pump.

The apparatus 100 includes a housing 110 having a first planar surface 120A and an opposing planar surface 120B. The housing 110 can include a metallic aluminum enclosure. The housing 110 includes a mount structure 130 located on its base or second planar surface 120B. The mount structure 130 allows for fast mounting to the exterior of metal pumps. In an exemplary embodiment, the mount structure 130 is a magnet.

A third planar surface 120C of the housing includes two LED indicators 150A, 150B. A first LED indicator 150A is configured to be illuminated when the apparatus 100 is synchronized with the signature of a pump cylinder while a second LED indicator 150B is configured to be illuminated when the apparatus 100 detects the RPM of the pump.

The housing 110 is configured to enclose one or more sensors, such as, accelerometers, vibration sensors, pressure sensors, displacement sensors and/or other sensors. The housing 110 can further include electronic circuitry, microprocessors which are configured to improve digital signal processing and firmware to process the valve signature data and pump stroke data and digitally transmit it a display unit. The housing 110 can further enclose a pulse shaper circuit and a comparator circuit to shape the raw signal detected by the apparatus 100. In some embodiments, the housing 110 can further include a divide by three relay circuit. As shown, the housing 110 can be substantially square in shape. However, in other embodiments, the housing 110 can be circular, elliptical, ovoid or any other desired shape.

The housing 110 further includes a fourth planar surface 120D. The fourth planar surface includes a connector 160 which can be configured to be connected to a cable to provide communication with the built-in microprocessor or circuitry.

Figure 1C:
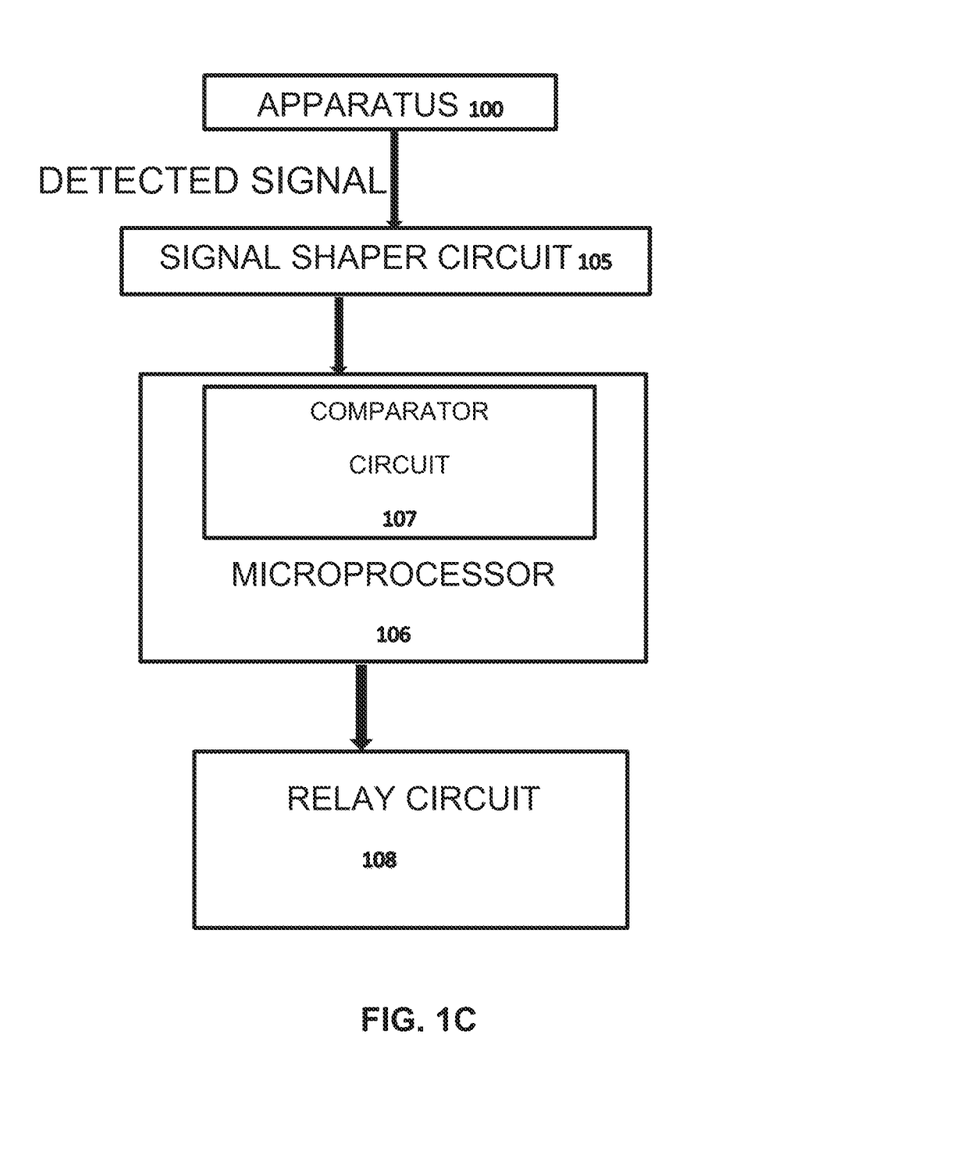
Figure 1D:
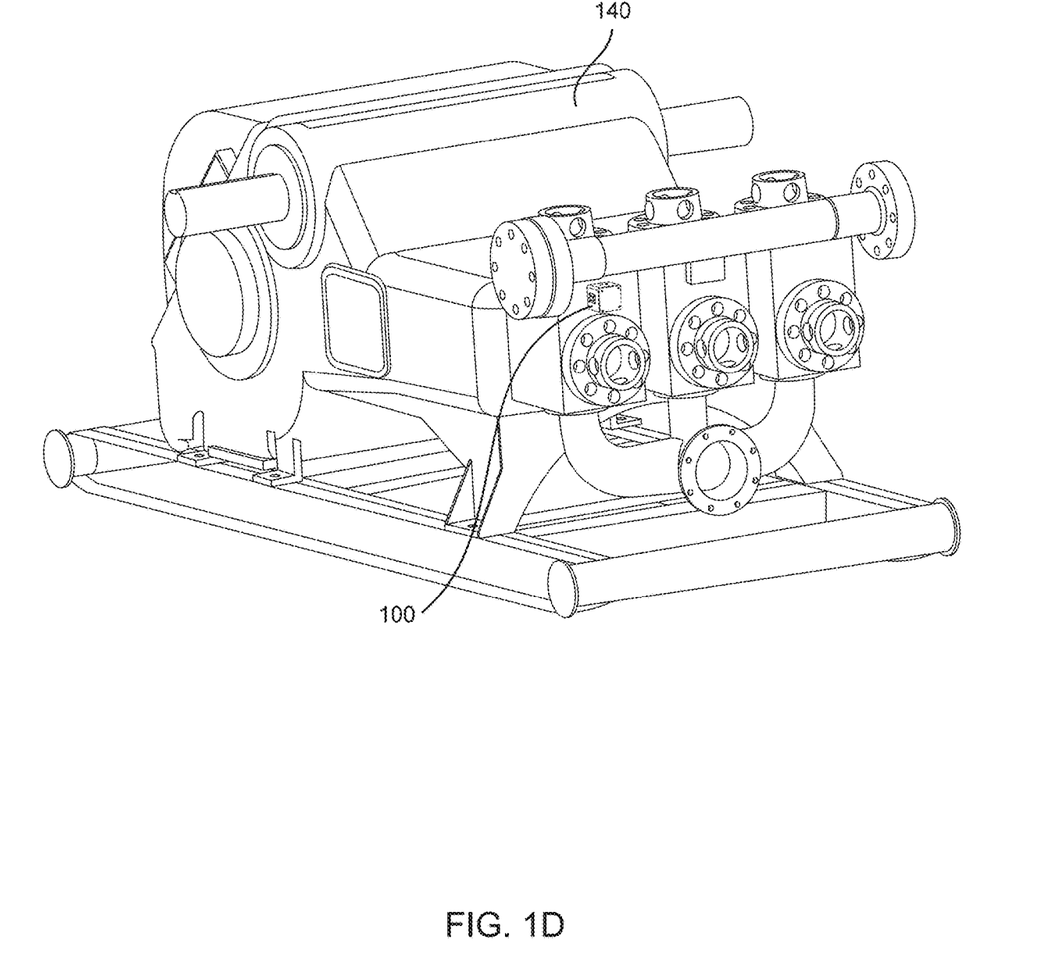
FIG. 1D illustrates the apparatus affixed to a triplex pump, according to an embodiment.

In certain embodiments, the magnet 130 may include a suitable cover 135. The cover 135 is removed before the magnet 130 can be mounted or attached to metallic pumps. As shown in FIG. 1C, the apparatus 100 can be mounted on any desired location on an exterior housing of a triplex pump 140.

Conveniently, since the apparatus 100 is installed on the outside of the pump 140, it does not require the opening of the pump or any modifications to the inside or surface of the pump. Therefore, this advantageously avoids the risks and issues associated with current techniques for installing pump sensors. For instance, it avoids the need for opening or modifying or removing the pump covers which could potentially lead to spills of potentially hazardous fluids. The apparatus 100 does not have to be bonded to the pump. The apparatus 100 is installed on an exterior surface of the pump using the magnet 130 located at the base of the housing. As such, it does not affect or stop the drilling process which, advantageously, does not impact rig productivity. The apparatus 100 is, therefore, easy and convenient to install. The apparatus 100 is environmentally friendly in comparison to current techniques. Thus, there is also no requirement to comply with cumbersome EPA regulations since it significantly reduces or eliminates any potential spills of hazardous material.

The apparatus 100 provides a non-intrusive magnetic mounting means for quickly installing it on pumps. The magnetic-base apparatus 100 is configured to determine the speed or RPM of a triplex, multi-cylinder pump by producing a digital output signal which facilitates precise calculations of the RPM. In certain embodiments, the signatures of each cylinder can be used to derive the speed.

In one embodiment, a method for determining pump and valve health is disclosed. The method involves providing the apparatus 100 having one or more accelerometers mounted inside its housing. The method involves attaching the apparatus 100 on an external surface of the triplex pump to detect movements of the pump surface, and therefore, the pump strokes. For instance, the apparatus 100 can attached to the pump head using the magnet at the base of its housing. As the pistons in the triplex pump are actuated, the accelerometers sense the actuation of the valves and detect the forces generated by the actuator to measure the motion of the valves. In the case of triplex pump having three cylinders, three valve signals are detected per revolution. The apparatus 100 can then subject the detected raw signal to pulse shaping. With reference to FIG. 1C, pulse shaping involves inputting the raw signal in its signal shaper circuit 105 to filter it and trace an upper profile or peak of the signal waveform. The signal shaper circuit can include a diode that charges a capacitor to track/trace an upper profile of the waveform. The method can further include adding a bleeder resistor on the capacitor. This can allow the capacitor charge to trace the upper shape of the waveform. The method further involves inputting the waveform into the built-in comparator circuit 107 which can be adjusted to track the higher peaks of the signal which represent each valve signature. The shaped signal is then put through the built-in divide by three relay circuit 108 (for triplex pumps) to divide the frequency of the shaped signal by three in order to generate a single signal pulse representative of the speed or "RPM" of the pump. These signals can be digitally transmitted to a display terminal.

Figure 2:
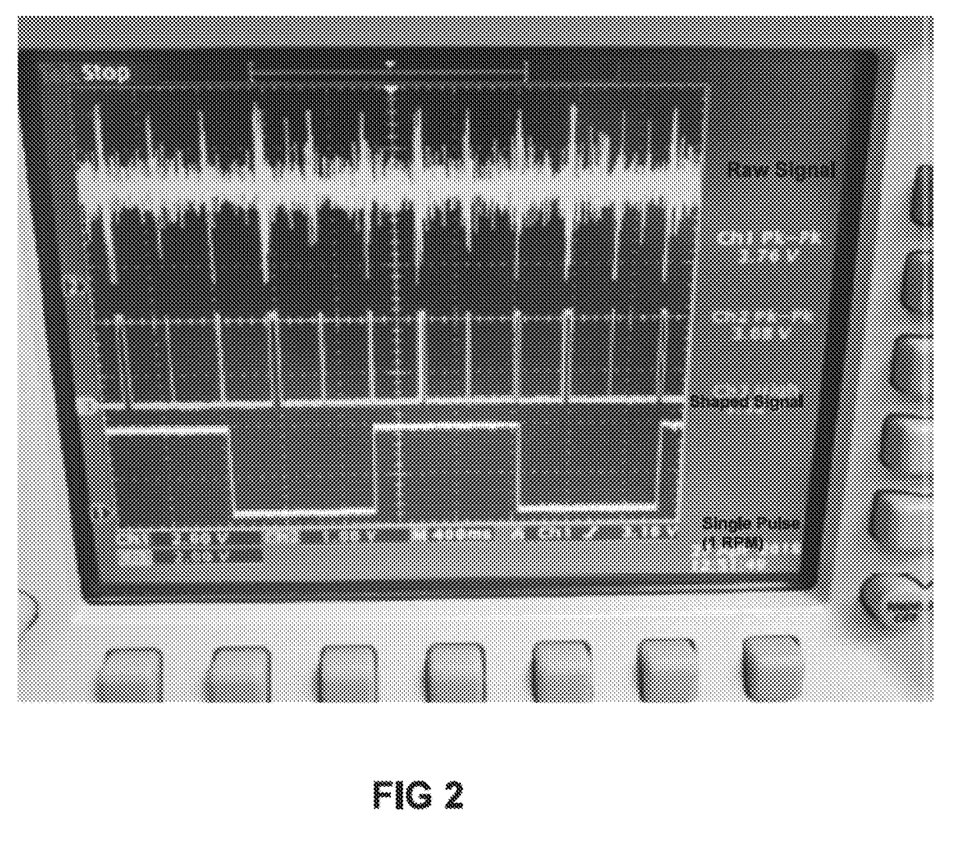
FIG. 2 illustrates an exemplary signal plot, according to an embodiment.

FIG. 2 illustrates an exemplary signal plot of the raw, shaped and single pulses. The output signal or "raw" signal from the accelerometers is shown on the first row. The shaped signal is shown in the second row while the single pulse signal is illustrated on the third row of FIG. 2. The plot provides a convenient mechanism for a user/pump operator to track and detect any problems with the pump.

In the oilfield, the inflow to the well is critical. The inflow to the well is the product of the speed of the pump and pump volume. Historically, pump rate was monitored for standard drilling purposes, so the pumps were typically running at a pump stroke rate of 30 RPM or higher. Newer techniques, such as under balanced drilling, may necessitate monitoring at much lower pumping rates—which could be as low as 3 RPM. In the traditional 1 pulse per RPM sensor devices, most computer counter calculations would detect the pumps during periods and not pumping if they were expecting a pulse every few seconds as a minimum. In certain embodiments, the method can involve inputting either one pulse per valve (three pulses per RPM) to obtain a better rotational resolution. Additionally, to get better resolutions, advanced techniques may be employed to observe the phase of the signature to get better than three positions per revolution emulating a resolver type output. Thus, the apparatus 100 facilitates improved pump position by monitoring multiple cylinders to derive the speed of slow moving pumps for applications like under balanced drilling.

In certain embodiments, the method further involves locating a drive motor of the pump to install a resolver on its shaft. In certain other embodiments, the method can involve monitoring the drive motor drive gear sprocket teeth to detect extreme low pump RPM based on drive gear movement or position in order to capture higher resolutions.

The method further involves plotting the pulse in a graphical format for user convenience. The method involves comparing the pump strokes detected by the apparatus 100 against a baseline at the time of install to track changes. Changes can be flagged for inspection after a defined deviation from expected profiles. The method further involves alerting a user to any predetermined material deviances from the baseline. This allows the user to rectify any issues and conduct preventive maintenance of the pump and its components before the problems worsen. In lieu of the apparatus 100, other pressure detection devices can also be used such as, a pressure strap (disclosed in U.S. Pat. No. 9,746,386), strain gauges, or pressure sensors can be used for monitoring pressure changes inside the pump cylinder head.

In another embodiment, a method for monitoring pump health involves measuring pump strokes with a microprocessor 106 circuit using digital signal processing. The method involves providing the apparatus 100 having one or more accelerometers mounted inside its housing. The method involves attaching the apparatus 100 on an external surface of the triplex pump to detect movements of the pump surface, and therefore, the pump strokes. The method involves using a microprocessor running a "fast Fourier transform" (FFT) algorithm that samples detected pump stroke signals over a period of time (or space) and divides it into its frequency components. These components are single sinusoidal oscillations at distinct frequencies each with their own amplitude and phase. This process optimizes accuracy of the corrected data and eliminates erroneous data points. The corrected signal can be digitally communicated to a display terminal.

Figure 3:
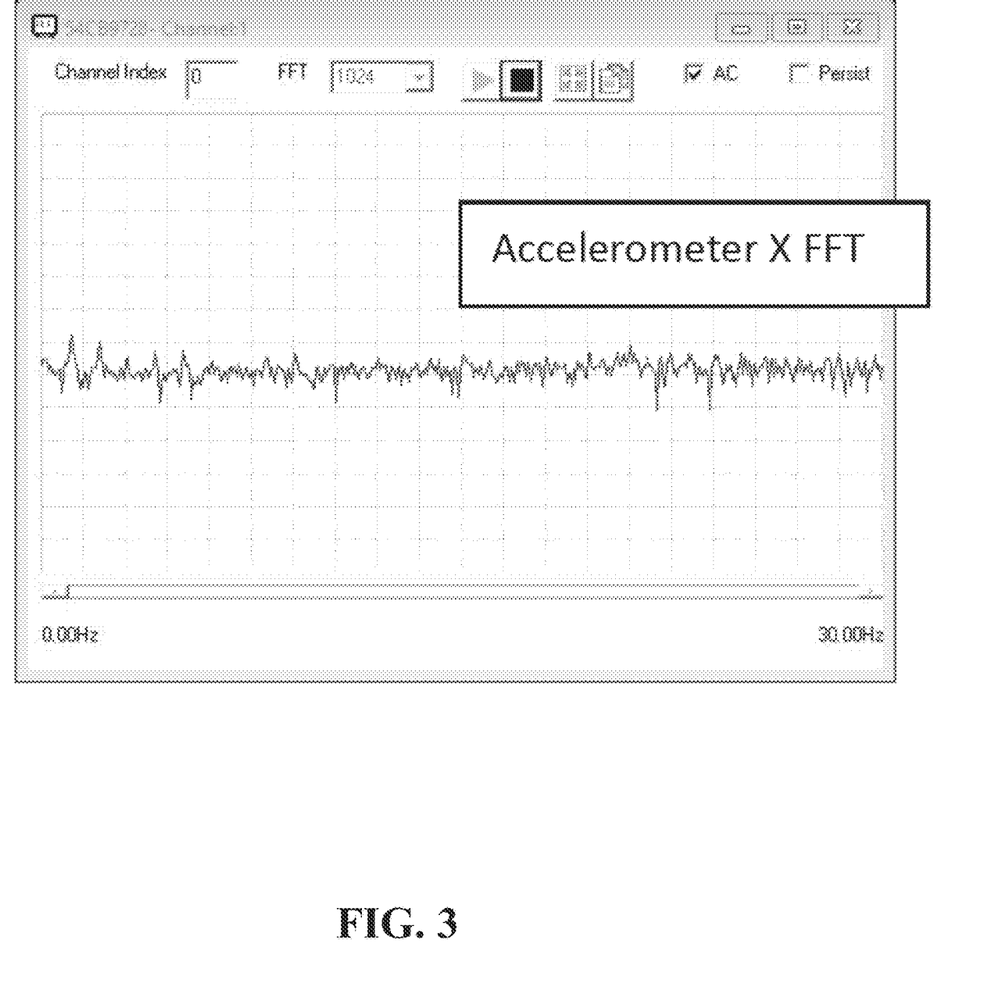
FIG. 3 illustrates a frequency spectrum plot for detected pump strokes, according to an embodiment.

The method involves converting complex signals into a frequency spectrum. The frequency spectrum of the signals can be displayed at the bottom of a plot. As shown in FIG. 3, the results can be plotted in an Accelerometer X FFT plot and displayed on the display terminal. The method further involves selecting a correct frequency peak. This selection involves utilizing predetermined information on the pump and its mechanics. In some embodiments, a first peak frequency may be the correct frequency peak. However, in other pump set ups, it could be different. After the digital microprocessor has converted the signal, the useable data can be communicated either wirelessly or in a customer desired format.

The method further involves using the frequency data to extract the pump strokes per minute, RPM or other usable measurements that may be needed for the pumps/drilling operation. For instance, as shown in FIG. 3, the first peak is approximately 1 HZ. The user can convert the 1 HZ (1 cycle per second) to RPM by multiplying it by 60 (seconds). This is converted to approximately 60 RPM. Thus, the user can determine the pump rotation data from the detected pump strokes.

In certain embodiments, the method further involves providing analog 4 mA-20 mA circuits which can be calibrated to give a more detailed representation of frequencies less than 1 Hz. The more precise but already existing analog channels will already have typically 12 bits of resolution resulting in much greater detail in the extreme low RPM rates sent to an end user in order to better communicate the resolutions in a short frequency spectrum.

In another embodiment, a method for monitoring pump health involves monitoring waveforms and frequency spectrums to determine the performance of a cylinder. The method involves providing a plurality of the magnetic-base apparatus 100, wherein the apparatus includes a vibration sensor mounted within. A first apparatus 100 can be affixed proximal to a first cylinder of a three cylinder triplex pump. A second apparatus 100 can be affixed proximal to an intake or discharge valve. The apparatus 100 is configured to detect signatures of the first valve and first cylinder and determine their corresponding waveforms and frequencies. A leaking valve has more signals between its openings and it may have a typical smaller valve "opening" signature. A good valve/cylinder combination will, on the other hand, have a strong pressure response when the valve opens and is quieter between the openings of the valve because of proper valve and cylinder sealing. The method involves comparing the signatures of the waves detected by the apparatus 100 against a baseline at the time of install to track changes. Changes can be flagged for inspection after a defined deviation from expected profiles. For example, the changes could indicate pump valve wear or cylinder leaks. Problems in this category can then be planned for maintenance before catastrophic failures occur resulting in non-productive downtime.

In another embodiment, a method for monitoring a pulsation dampener is disclosed. The method involves providing the apparatus 100, wherein the apparatus includes one or more pressure sensors mounted inside its housing. Pulsation dampeners are commonly used wherever a triplex pump discharges flow in an unsteady manner, and where the pulse is not desired for the optimal operation of the pump system. The method involves affixing the magnetic-base apparatus 100 on a top pressure port of the pulsation dampener. The apparatus 100 detects the pressure changes and generates an output signal. The output signal can be converted into a pulse stream using a conditioning circuit. The pulse stream can be configured to be representative of the working movements of the pulsation dampener. By monitoring the pulsation dampener, the pulses and therefore, the pump strokes can be detected. In lieu of the apparatus 100, other pressure detection devices can also be used such as, a pressure strap (disclosed in U.S. Pat. No. 9,746,386), strain gauges, or pressure sensors can be used to monitor pressure changes inside the pulsation damper.

The embodiments of the invention utilize acoustic, displacement and pressure measurements to monitor pump characteristics. The apparatus and methods disclosed herein do not require any interruption to production operations and there is no undue exposure to hazardous fluids. The apparatus can be conveniently mounted using its magnetic base at any desired location on the pump housing surface.

Although the embodiments are discussed with reference to monitoring pumps for the oil and gas industry, a person skilled in the art can understand that these embodiments be used in any industry that employs pumps and require the monitoring of valve and cylinder health. For example, the embodiments may also be used in refineries, chemical plants, water and waste water treatment plants, pulp and paper plants, etc.

The data from the one or more embodiments disclosed herein may be stored as computer program instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing one or more functions.

Any combination of one or more computer readable medium(s) may be utilized. The computer readable medium may be a non-transitory computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only.

The invention claimed is:

1. An apparatus for monitoring a triplex pump, comprising:
    a housing having a first planar surface and a second planar surface opposite the first planar surface, wherein the housing is configured to enclose one or more sensors, wherein the one or more sensors are configured to detect a characteristic of the triplex pump and generate a corresponding signal, the housing comprising:
    a signal shaper circuit, the signal shaper circuit configured to shape the signal;
    a comparator circuit, the comparator circuit configured to track one or more peaks of the shaped signal; and
    a mount structure located on the second planar surface, wherein the mount structure is configured to facilitate attachment of the apparatus on an external surface of the triplex pump, and wherein the mount structure avoids penetrating an inside surface of the triplex pump,
    and
    wherein the pump has three cylinders.

2. The apparatus according to claim 1, wherein the mount structure comprises a magnet.

3. The apparatus according to claim 1, wherein the housing comprises a third planar surface, wherein the third planar surface comprises a plurality of LED lights, wherein at least one LED light is configured to provide an indicator of a speed of rotation of the triplex pump.

4. The apparatus according to claim 1, wherein at least one of the one or more sensors is an accelerometer.

5. The apparatus according to claim 1, wherein the housing further comprises a relay circuit.

6. A method for determining health of a triplex pump, comprising:
providing the apparatus according to claim 1, wherein the apparatus is configured to be mounted on a head of the triplex pump, and wherein the apparatus is configured to detect a first signal waveform indicative of at least one of a valve signature and a speed of the triplex pump; and
inputting the detected signal into the signal shaper circuit and the comparator circuit such that the detected signal is filtered to generate a second signal waveform having one or more defined peak forms.

7. The method according to claim 6, wherein each peak is representative of a valve signature.

8. The method according to claim 7, wherein the method further involves putting the second signal waveform through a relay circuit to generate a third signal waveform.

9. The method according to claim 8, wherein the relay circuit is configured to divide the frequency of the second signal waveform by three to generate a single signal pulse representative of the speed of the pump.

10. The method according to claim 9, further comprising digitally transmitting each of the three waveforms to a display terminal.

11. The method according to claim 10, further comprising displaying each of the three waveforms in a single graph.

12. The method according to claim 11, further comprising flagging the triplex pump for inspection when a deviance from a baseline speed of the triplex pump is observed.

13. A method for determining health of a triplex pump, comprising:
providing the apparatus according to claim 1, wherein the apparatus is configured to detect one or more pump stroke signal waves of the triplex pump on which the apparatus is mounted, and wherein the apparatus includes a microprocessor running an algorithm for sampling detected pump stroke signal waves over a period of time and dividing it into one or more frequencies;

generating a graphical display of the frequencies;

obtaining data on a first peak frequency; and determining pump stroke data by converting the first peak frequency data into revolutions per minute (RPM).

14. The method according to claim 13, further comprising flagging the triplex pump for inspection when a deviance from a baseline RPM is observed.

* * * * *